455-612   AU 233   EX
XR   3,778,795

United States Patent [19]
Campman et al.

[11] 3,778,795
[45] Dec. 11, 1973

[54] REMOTELY CONTROLLED AUTOMATIC UTILITY METER READER

[75] Inventors: James P. Campman, Silver Spring; Jack H. Linscott, Bethesda, both of Md.

[73] Assignees: said Linscott, by said Campman, Bethesda; Vidar Laboratories, Inc., Kensington, Md.; part interest to each

[22] Filed: Mar. 13, 1972

[21] Appl. No.: 233,885

[52] U.S. Cl. ............................. 340/188 R, 340/380
[51] Int. Cl. ............................................. G01f 15/06
[58] Field of Search ................. 340/188 R, 188 CH, 340/380, 151; 250/213 A

[56]           References Cited
           UNITED STATES PATENTS
3,573,773   4/1971   O'Hanlon ...................... 340/188 R
3,441,923   4/1969   King .............................. 340/188 R
2,007,669   7/1935   Yates ............................. 340/188 R
2,494,370   1/1950   Swartzel et al ............... 340/188 CH

*Primary Examiner*—Donald J. Yusko
*Assistant Examiner*—Marshall M. Curtis
*Attorney*—Jack H. Linscott

[57]           ABSTRACT

A remotely controlled apparatus for reading a plurality of dials of a totalling type meter in sequence, for producing a plurality of signals, one signal for each dial read, with the character of the signal determined by the position of the indicator relative to its dial and which automatically terminates its activity when all of the dials have been read.

1 Claim, 7 Drawing Figures

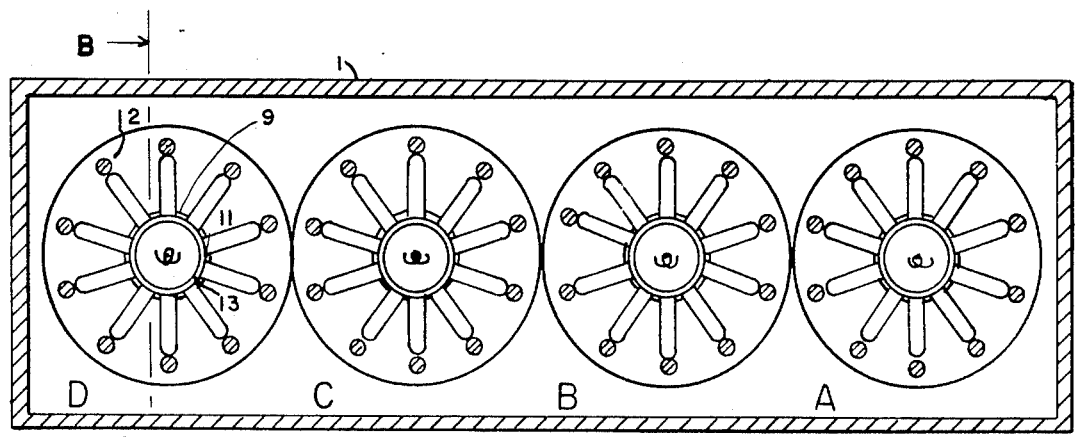
FIG. I
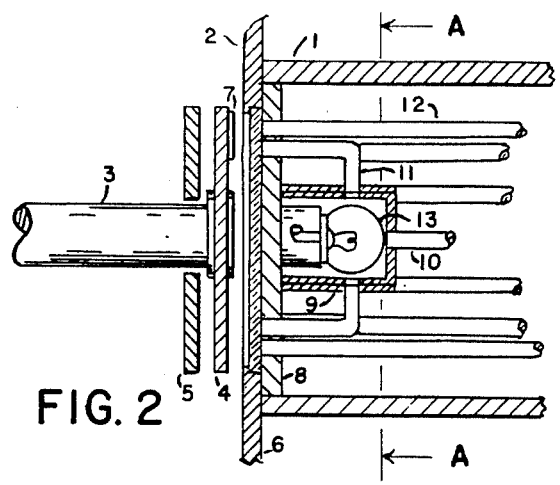
FIG. 2
FIG. 1a
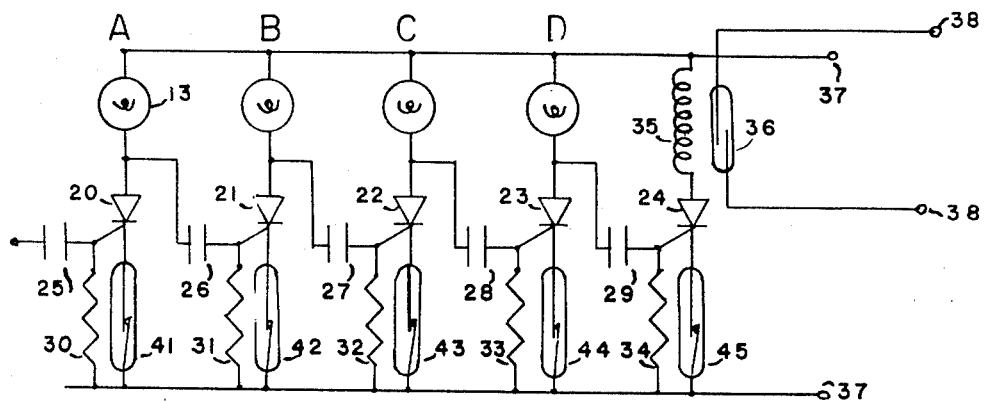
FIG. 3

REMOTELY CONTROLLED AUTOMATIC UTILITY METER READER

This invention relates to a meter reading system particularly, to a means for reading utility company meters and for transmitting the reading to the billing office of the utility company as by a telephone system.

The utility companies supply services as for example, gas, electricity and water, generally to customers at widely scattered locations. A meter is provided at the customers location for metering the amount of services or consumption that is used by the customer. Periodically, usually once per month, the utility company sends out their meter reader, who visits the customers home or place of business whereever the meter is located to read and record the reading. This is used for determining the bill that is rendered. For the meter reader to gain access to the meter he must be admitted to the home or place of business where the meter is located, necessitating that the customer or someone to be present at the time the meter reader calls. In the absence of the customer, the meter reader leaves a card to be filled in by the customer, or he has to return later to read the meter. This presents an inconvenience to the customer and one that offers some peril for with the constant changing of personel the customer cannot know that it is safe to admit the meter reader even though he may be clothed in the utility company uniform.

There is also a large labor cost involved in hiring personel to read the meters and to keep an adequate staff to accomplish the task. The task is onerous, requiring a great deal of walking on the part of the meter reader, a large consumption of time, and the turn over of personnel is great.

Considerable saving in labor costs can be realized if the meters could be read automatically and the information transmitted to the utility company office by telephone. The number of employees engaged in the task of reading meters could be materially reduced. The onerousness of the task could be reduced so that the turn over of personnel could be reduced. The customers would not be put to an inconvenience of admitting a meter reader and the meters could be read on a predetermined date each month thereby assuring that the reading represents the true consumption.

Automatic meter reader heretofore have been conceived and invented for reading the meters and for transmitting the reading to the utility company office. However, such apparatus has not found widespread acceptance because, the apparatus involved considerable modification of the existing meters, because of the probable high cost of maintenance, and because of the high costs for the apparatus and its installation. Also, some if not most of the meter readers heretofore proposed, imposes a load on the meter mechanism that renders their operation erratic.

Our invention seeks to overcome the objection of previous systems for accomplishing the desired results by requiring a bare minimum of modification of the meters, by eliminating the need of imposing an additional load on the meter mechanism and by requiring no modification of the telephone system other than the provision of a connection. Further, our apparatus requires the minimum of components and parts and can be produced from available parts which would result in a low cost unit. Our apparatus has its own power source such as a low voltage battery having long life that makes it unnecessary to connect high voltage sources to the telephone system that might due failure of components place high voltages on the telephone system. Our apparatus is also compatable with various systems for automatically recording the readings and billing the customer by use of computer apparatus.

Our apparatus used light energy for scanning the meter dials and for actuating the controls of a tone generator in accordance with the position of the indicating element of the meter to produce a sequence of distinctive tones indicative of the meter reading. The operation of the meter reader is initiated under the control of the utility company employee after the connection between the utility company telephone and the customers telephone has been established. This is accomplished through use of an interrogating signal which when received by the customers meter reader will connect the meter reader to the telephone line, and energize the meter reader and initiate its operation. At the conclusion of the meter reading operation the meter reader is automatically disconnected from the telephone line and de-energized thus consuming no power until the next time the interrogating signal is received.

The representative embodiment of the invention requires that the pointers of each of the dials be removed and replaced by a black matte coated disk with a reflecting spot arranged near the periphery of the disk. The position of the reflecting spot indicates the reading of the meter the same as the pointer it replaces. Fastened to the outside of the meter is the meter reader. It is designed to fit over the window through which the meter is usually read and is provided with a masking wall that has a separate set of detecting means positioned opposite each dial. The detecting means comprises a means for illuminating each of the dial positions, a means leading from each of the dial positions to a photosensitive element for the exercise of control of a signal generator, and a tone generator for generating a signal transmitable over a telephone system. The meter reader also includes means for powering its operation and means for turning the power on, for connecting the signal generator to a telephone line, and for initiating the meter reading operation and a means operative at the conclusion of the meter reading operation for disconnecting the signal generator from the telephone line and for de-energizing the meter reader.

It is an object of the invention to provide a meter reading apparatus that is reliable in operation and economical in cost and maintainance.

Another object of the invention is to provide a meter reading apparatus that adds no additional load on the meter mechanism.

Still another object of the invention is to provide a meter reading apparatus that can be installed without any substantial modification of the meter.

Other objects of the invention will become obvious from the specification and the appended drawing.

In the drawings

FIG. 1 is a sectional view in elevation of the meter reader taken on line A—A of FIG. 2;

FIG. 2 is a sectional view in elevation taken on line B—B of FIG. 1;

FIG. 3 is a schematic view of the circuit of means for automatically sequentially illuminating the dial of the meter;

FIG. 1a is a fragmentary view of the meter indicator as modified by the invention.

Figure 5:
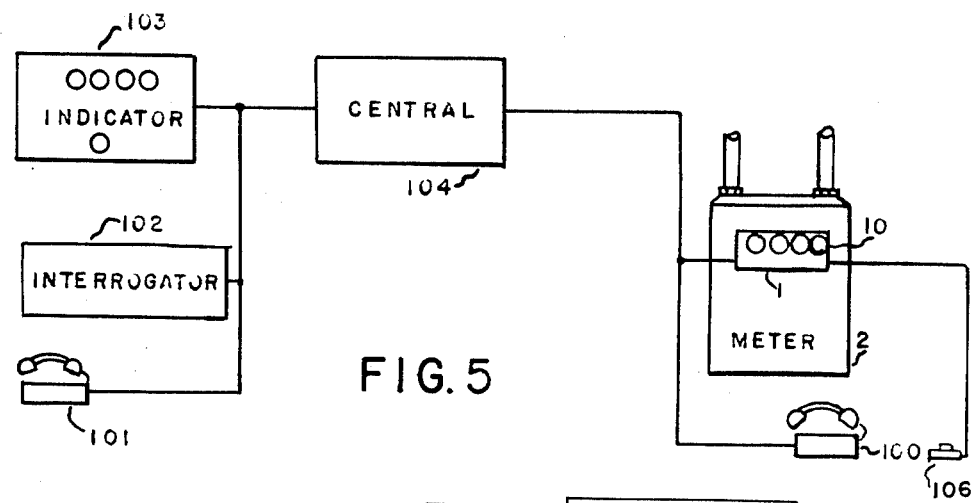
FIG. 5 is a block diagram of the overal system with which the meter reader is associated.

Referring to FIG. 5 of the drawings, there is disclosed in block diagram, the system in which the invention is designed to operate. At the utility company office will be a telephone line extension 101 for dialing the customers telephone number for establishing a connection with the customers telephone extension 100. Once such connection is established, an interrogating signal from the interrogator 102 is sent out over the ringing circuit of the telephone line to initiate the operation of the meter reader 1. Also included in the apparatus located at the Utility Company office is an indicator 103, which may provide a numerical read out of the meter reading or any other kind of a record. Such apparatus is well known and forms no part of the present invention.

At the customer's end of the telephone line is a meter 2 having a meter reader 1 attached to the window of the meter for reading the dials and providing a sequence of tone signals, equal in number to the number of dials that are read for transmission over the telephone system by the voice circuit thereof. The tone signals may be in the audible range or if desired may be in the ultra-sonic range so that they would not be audible to the human ear. The tone signals received at the ulitity company end of the line are received by the indicator wherein the tone signals are converted to a numerical readout or recording.

As also shown in FIG. 5, the meter reader is provided with four light rods 10 that have their ends showing on the face of the casing 1 of the meter reader. These light rods 10 function to provide visual indication of the operation of the illuminating means whereby the operation of the reader can be tested. Also provided is a push button 106, preferably located near or on the telephone hand set 100, for providing an interrogating signal at the customer's end of the line either for testing the operation of the reader or for providing a meter reading when the customer answers the telephone.

Referring now to FIG. 1 of the drawings, there is illustrated the casing 1 of the meter reader apparatus in which is housed the apparatus for reading the dials of the utility meter. As shown, lamps 13 for illuminating the dials of the meter at the positions A-D are mounted on the inner side of the meter reader casing wall that fits over the meter window. The lamps 13 are housed within a light casing 9 whereby the light energy is contained and limited in its illuminating effect. Light conducting rods 11 extend through the casing 9 to pick up the light energy of an illuminated lamp 13. The light conducting rods 11 extend from the case 9 to and through the casing wall in a position opposite each of the divisions of the dial. Also penitrating the casing wall 1 adjacent to the light rods 11 are light rods 12 for picking up light reflected from interior of the meter casings from regions of the dial division's and for conducting said light energy to a photosensitive element which as it will appear as the disclosure proceeds controls the frequency of a signal generator. It will be noted in FIG. 1 that each dial position includes a separate lamp 13 and systems 11 and 12 of light conducting rods.

Referring also to FIG. 2, showing the meter reader in section taken on line b-b of FIG. 1, the meter includes a shaft 3 having an indicator 4 and a dial 5 graduated into 10 divisions. There is a shaft 3, a dial 5 and an indicator 4 at each of the positions A-D inclusive. The shafts 3 of the separate dials are connected by a Geneva gearing whereby the shafts from A to D will register in units of tens, hundreds, thousands and tens of thousands. In the unmodified meter, the indicator is in the form of a pointed or hand that sweeps across the dials the position of which relative to the divisions on the dial provide the reading. The gear train is as usual driven by the meter mechanism.

Figure 1B:
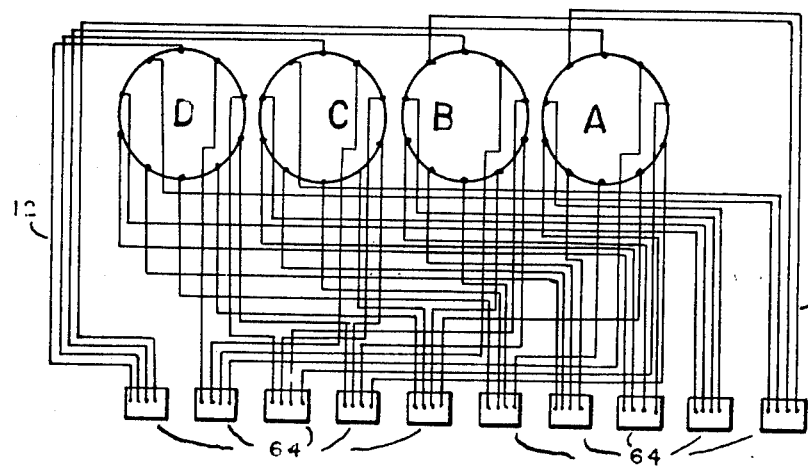
FIG. 1b is a schematic view of the light circuits for connecting the meter dial positions to photosensitive devices for controlling the signal generator.

When the meter 2 is to be used with the meter reader 1, it is modified to the extent that the pointer is removed from the shafts 13 and replaced by a disk 4, having a black nonreflecting coating over substantially its entire surface. Positioned on the disk near its periphery and extending annularly of the disk is a reflecting patch 7 either as a coating or as an insert. The annular dimension of the patch 7, shown more clearly in FIG. 1a is sufficient to span the distance between two divisions of the dial. This arrangement is essential to the proper operation of the reader, that is, to assure that at least one but not more than two light rods 12 will receive reflected light energy from the patch 7 while a lamp is energized. The reflecting patch 7 when opposite one of the light rods 11 will receive light energy from the light rod 11 when the dial lamp 13 is energized, and reflect the light energy into the light conducting rod 12 through which it is conducted to a photosensitive element 64, see FIGS. 1b and 4. While this occurs at one of its dial positions A-D, all other dial positions are darkened by reason of their lamps being not energized, thus there will be only one photosensitive element 64 energized by the light energy at a time, except, when the patch 7 is positioned such that it spans the distance between two divisions of the dial. By this arrangement there will always be a reflection from at least one rod 11 to a rod 12 no matter what position the patch 7 is in. In the instance where the patch 7 spans the distance between two divisions of the dial only the rod 12 opposite the leading edge of the patch 7 will be effective as will be evident when the tone generator is described.

As seen in FIG. 2 light rod 10 extends from the casing 9 towards the front wall of the casing 1 to transmit light to the exterior of the casing so that the operation of the lamps 13 can be observed while the meter reader is being tested as has been previously mentioned.

As seen in FIG. 1b, the light conducting rods 12 are diagrammatically shown to lead from like positions relative to each dial A-D to a single photosensitive element 64, that is, a light conducting rod 12 connects each position opposite the O division point of each dial at A-D to a single photosensitive element 64. Similarly, from each of the positions opposite the other dial divisions, a light conducting rod 12 connects to a photosensitive element 64, whereby, each photosensitive element 64 has as many light conducting rods 12 leading to it as there are dials to be read.

As illustrated, each dial position A-D inclusive are arranged as if the shafts 13 of all the dials rotate in the same direction. This manner of illustration is used for the purpose of more clearly showing the connections.

In the actual meter installation, the alternate shafts rotate in opposite directions.

In this arrangement, while four light conducting rods 12 lead to each photosensitive element 64 only one of the light conductive rods 12 leading to any single photosensitive element will ever be conducting light energy at one time. This is because only one of the dial positions A-D will be illuminated at a time. If the distance between two divisions of any one dial is spanned by the patch 7, adjacent light conducting rods 12 will conduct light energy to adjacent photosensitive elements 64 and as previously mentioned, only the photosensitive element 64 in the circuit nearest the oscillator will be effective to control the character of the signal to be transmitted.

As heretofore described, the invention contemplates that the lamps 13 in each of the dial positions A-D will be energized one at a time in sequence, so that no more than one lamp will be energized at a time. The operation of the lamps in this manner is in effect a scanning operation of the dial positions of the meter, because as the lamps are sequentially energized the illumination of the dial positions travels across the array of dials positions. As this occurs the light conducting rods 12 illuminated by the reflecting patch 7 become operative to control the character of the transmitted signal.

FIG. 3 discloses schematically a circuitry of a means for causing said scanning means to operate when once it is triggered into operation. The direction of the scan is immaterial, however a scan from right to left is prefered. The triggering input to the circuitry is through the capacitor 25. How this input is generated will be late described. The lamps 13 are connected in parallel-circuits across a source of voltage connected to the terminals 37,37 when the meter reader is energized. Each parallel circuit includes a lamp 13 in series with a silicon control rectifier and thermo-actuated breaker. The SCRs are designated 20 to 24 inclusive and the breakers are designated 41 to 45 inclusive. The thermo-actuated breakers are normally closed and represents one of several possible means for automatically opening the parallel circuits after they have once been closed or energized through the triggering of the SCR therein. The SCRs each operate as means for switching on the circuits that include the lamps 13. As is known, once such switches are turned on, the trigger circuits become ineffective to control the circuit and the breakers 41-45 thus operate automatically after a short period of a few seconds to open the circuit that has been previously energized by the operation of the SCR in the circuit.

The initiating pulse applied through the capacitor 25 triggers the SCR 20 into conductivity. Resistor 30 normally biases the control at a cutoff voltage. The positive pulse on the capacitor momentarily raises the control voltage high enough to start conductivity. After a few second the thermal element of the breaker causes the breaker to open to break the circuit and stop the flow of current through the lamp 13 in the circuit. Since the lamp respresents a resistance, cessation of the current flow therein, in effect, raises the junction between the lamp 13 and the SCR 20 suddenly to that of voltage source. While SCR 20 is conductive the voltage at said junction is lowered by the resistance of the lamp 13 creating a voltage drop. Thus when SCR ceases to conduct a positive going pulse is transmitted through the capacitor 21 to the control electrode of the SCR 21 to trigger it into operation, causing the lamp in its circuit and at position B to be energized. Similarly, after a few seconds the breaker 42 opens the circuit causing the lamp to be de-energized and a pulse to be transmitted through the capacitor 27 to the control electrode of the SCR 22. This causes the SCR 22 to conduct to cause the lamp in position C to be energized. After a few seconds the breaker 43 operates to break the circuit to de-energize the lamp and to transmit a positive pulse to the control electrode of the SCR 23 to trigger it into conductivity to energized the lamp 13 is position D. This operation complete the scan of the dial positions. The last parallel circuit includes a magnetizing coil 35 which embraces the read switch 36. When the SCR 23 ceases to conduct a pulse is transmitted through the capacitor 29 to the SCR 25 rendering it conductive. This energizes the coil 35 to cause the reeds of the switch 36 to close on each other. This switch, as it will soon appear operates to discontinue the operation of the meter reader.

Figure 4:
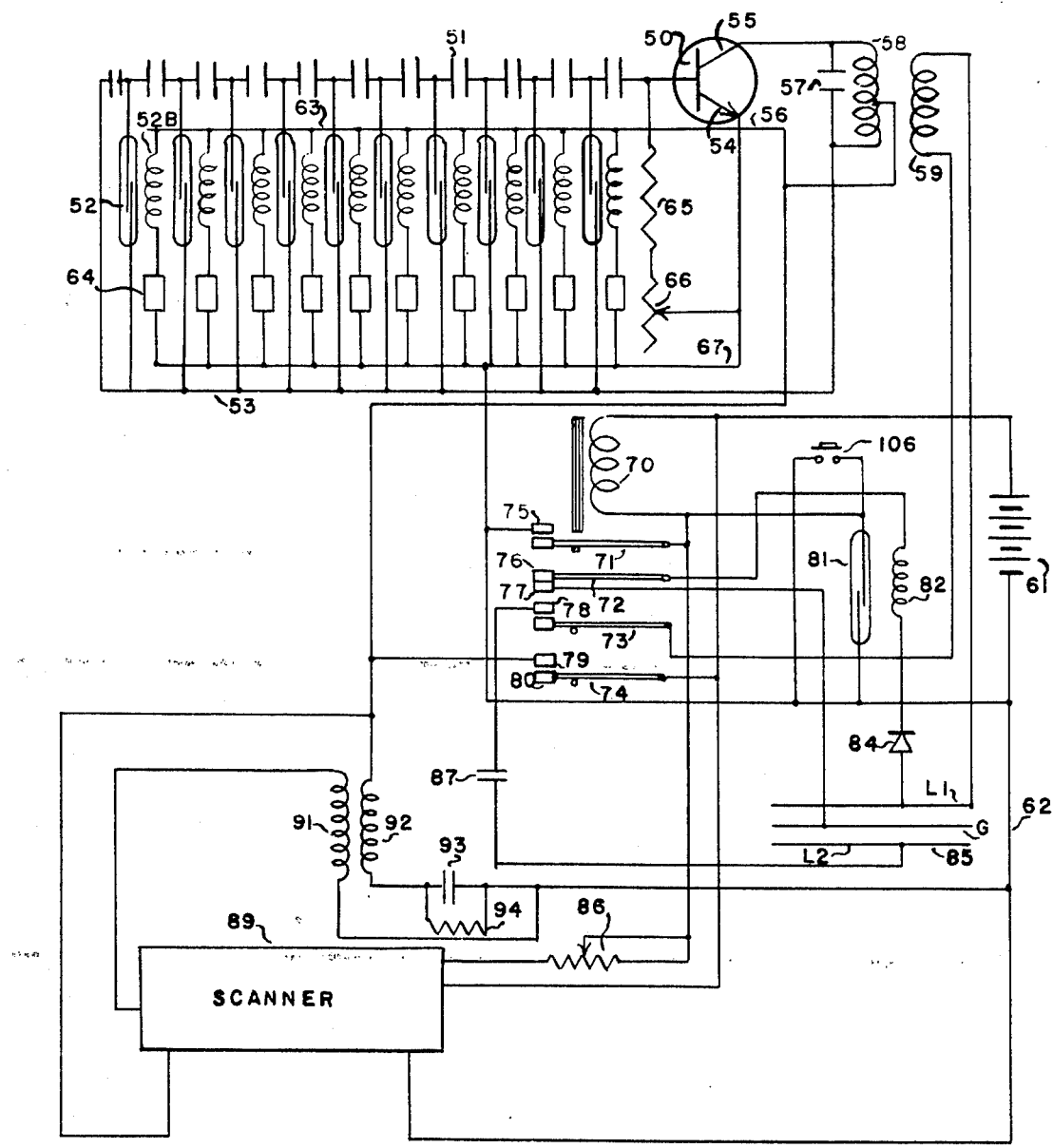
FIG. 4 is a schematic view of the signal generator the switching means and the scanner.

Referring to FIG. 4, there is illustrated the signal generator, the relay mechanism for performing the switching operations and the scanning means 89 shown as a block.

Each one of the photosensitive elements 64 shown in FIG. 1b, to which light rods 12 are led, are shown in FIG. 4 in relation to the signal generator which they are arranged to control. The photosensitive elements 64 are connected in parallel circuits which also include coils 52a. The parallel circuits are connected across the source of voltage 61 applied between the busses 56, 67. The coils actually embrace the reed switches 52 which when energized create and produces a magnetic field which closes the reed switches 52. The photosensitive devices can be any one of a number of light responsive devices which will close a circuit, one of which is a silicon diode.

The signal generator in the illustration is an oscillator selected as a matter of choice to produce an audible or ultra-sonic tone. It consists of a transistor having a base electrode 50, a collector electrode 55 and an emitter electrode 54. The output circuit of the oscillator includes a trasformer having a primary winding one terminal of which is connected to the collector electrode. The primary winding 58 is connected intermediate its terminals to and through a switch 79,80 to the positive side of the source of voltage 61. The emitter electrode 54 is connected through the buss 67 to the negative side of the source of voltage 61. Te base electrode 50 is connected through resistor 65 and varible resistor 66 to the emitter electrode for controlling the bias on the transistor. Also connected to the base electrode 50 is an array of capacitors 51 connected in series and to buss 53 to the other terminal of the primary winding 58 of the output transformer. The array of capacitors 51 constitute the control means for controlling the frequency of the output of the oscillator and the character of the signal that is fed to the output circuit. Connected in parallel from points between the capacitors 51 in the array to the buss 53 are the reed switches 52 which as previous described are under the control of the photosensitive devices 64. When a reed switch 52 is closed it short circuits capacitors 51 to the left of the closed reed switch so that only those capacitors to the right of the closed reed switch 52 are effective to control the frequency of the oscillator. Should two of the reed swithes be closed simultaneously, as when the reflecting patch 7 spans two divisional points of the dial, only the reed switch closest to the base electrode of the oscillator will be effective.

The transformer also includes a secondary winding 59 in which is induced the tone transmitted to the primary winding 58 and through switch means connects the output to the talk lines of the telephone system The whole operation of the production of a sequence of tones of different characteristic is initiated and carried through by the sequential scanning of the different dial positions A - D which is initiated in response to an interrogating signal received over the telephone line from from the office of the utility company.

The telephone line is represented by the reference numeral 85 has three conductors designated L1, L2, and G . Between the common conductor G and one of the line conductors L1 and through the switch contacts 76, 77 is connected a coil 82. Also connected in series with said coil 82 is a rectifying component 84 such as a diode. The coil 83 embraces the reed switch 81 whereby energized produces an magnetic field that causes the reeds of the switch 81 to close on each other. This coil 82 is normally connected to the ringing circuit of the telephone line, which in the present case is between one of the conductors L1 and the common conductor G. The contacts 76,77 are normally closed except while the meter reader is in the process of reading the meter.

The reed switch 81 is connected between one side of the source of voltage 61 and one terminal of a relay coil 70, the other terminal of which is connected to the other side of the source of voltage 61.

Until such a signal is received through the coil 82 the contacts of each of the relay switches are in their lower or normal position When a properly polarized D.C. voltage is applied across the ringing circuit, the coil 82 will be energized causing the reed switch to connected the coil 70 across the source of voltage 61. This operates the relay switches causing them to be moved to their upper position.

Once the coil is thus energized, the contacts 71, 75 are closed which operate to short the reed switch 81 and latch the relay switches in their upper position. In sequence made possible by the connections between the various movable contacts, the contacts 76 and 77 are opened thus disconnecting the ringing circuit from the line. This followed closely by the closing of the contacts 73, 78 which connects the output circuit of the oscillator across the telephone lines L1 and L2 and the closing of contacts 79 and 80 which connects the source of voltage 61 to the oscillator and the scanning means. The signal generator immediately produces a tone, indicative that the signal generator is operative.

After the first tone is generated, which is independent of the reading of the meter dials a positive voltage pulse is applied through the transformer windings 91, 92 to the capacitor 25 of the scanner to trigger the scanner into operation. At that moment, the dial position A-D are sequencially illuminated The reflective patches on each of the disk at A-D will determine which one of the photosensitive devices that will be energized which tone characteristic that the signal generator will produce in response to the sequential illumination of the positions A-D.

At the conclusion of the scanning operation represented by the sequential operation of the lamps 13, the coil 35 is energized to cause the reed swtich 36 to close. This reed switch is connected in series with a variable resistor 86 across the coil 70 of the relay, short circuiting it to the extent necessary to unlatch the relay causing all movable contacts to drop to their lower positions. In their lower positions contacts 71,76; 73,78; and 79,80 all open to open the latch circuit, to disconnect the secondary winding 59 from the telephone line and to de-energize the meter reader. Also, with the opening of the above mentioned contacts, the contacts 76,77 are closed to re-establish connection of the coil 82 to the ringing circuit preparatory for the next meter reading.

As will be obvious from the preceeding disclosure, the source of voltage is disconnected from everything, except when the meter reader is actively engaged in reading the meter, thus, there is very little consumption of power, because the power is turned on only once a month for not more than thirty seconds at the most. Under these conditions the battery source of power will last a very long time. The use of a battery is an advantage in that it cannot through malfunction of the reader apply high voltages to the telephone system thus the telephone system is not liable to be damaged through the use of the reader. Further, the battery source renders the meter reader independent of availability of the power lines.

Connected across the reed switch 81, in shunt therewith, is the push button 106, previously mentioned, for initiating the operation of themeter reader. This push button enables the testing of the meter reader for proper operation with recourse to a signal from the utility company office. It also provides a a means whereby the customer may initiate the operation of the meter reader as when the utility company employee requests the customer to do so.

The use of light sources to scan the various dials of the meter eliminates the need for contacts, that are subject to malfunction due to corrosion The use of photosensitive detectors to detect the positions of the indicators eliminates the need to connect the shafts of the meter to mechanism that would impose a mechanical load thereon, that might render the meter mechanism inaccurate.

The meter is simple in design, utilizing readily available components, comparatively few in number, and at low cost enabling the meter reader to be produced at low cost making it economically acceptive. This also keeps the costs of maintanence at acceptable levels.

The meter reader is installed on the exterior of the meter over the widow of the meter through which the reading operation is performed. A very minor alteration of the meters is required, that of replacing the pointers with disks to make the meters compatable with the structure and mode of operation of the reader.

The external installation of the reader makes it readily accessible for servicing and replacement.

No major alteration of the telephone system is required, other than the installation of a simple plug-in jack near the location of the meter to permit the reader to be plugged into the customers telephone line Finally, a very simple interrogating signal is used to initiate all the actions of the reader which consists of sequentially illuminating the dial positions that results in the generation of a sequence of tones representative of the reading of the meter. There are no mechanical movable parts except the relay switch means which also is capable of being replaced entirely by electrical components. The major switches are of the reed type, enclosed in sealed enclosures and are not subject to corrosion.

These and other advantages evident from the disclosure render the invention useful and worthwhile and fulfill the requirements of an invention.

The invention sought to be patented is defined in appended claims.

We claim:

1. An automatic meter reader for totalling meters, said meters having a casing, a window in said casing, an array of meter dials in the interior of said casing behind the window thereof, said dials being graduated into ten divisional points and an indicator means movable relative to each of the dials, the composite of the positions of the indicators relative to the divisional points of the dials being indicative of the reading of said meter, said meter reader comprising;

a meter reader casing for attachment over the window of said meter casing on said casing;

a single signal generator for producing at least ten distinct signals, one for each of the divisional points of the dials;

an illuminating means automatically operable for sequentially illuminating the faces of said dials for short periods of time;

viewing means for viewing the positions of said indicator means relative to the divisional points of its dial, when said dial is illuminated;

ten photosensitive means, one for all similar divisional points of the dials associated with the viewing means of the dials, responsive according to the positions of said indicator means as seen by said viewing means while said dials are illuminated;

control means operable by said photosensitive means for determining the character of the signal generated by said signal generator;

means responsive to an interrogating signal for energizing and activating said meter reader, for connecting said signal generator to a telephone line for the transmission of said signals and for initiating the operation of said illuminating means; and means operable at the conclusion of the operation of said illuminating means for disconnecting the signal generator from the telephone line and for de-energizing said meter reader.

* * * * *